Sept. 6, 1955  U. TORRICELLI  2,716,978
APPARATUS FOR TESTING AND MEASURING HUMAN REFLEXES
Filed June 28, 1952  12 Sheets-Sheet 1

INVENTOR
Ugo Torricelli
BY Albert C. Jacobs
ATTORNEY

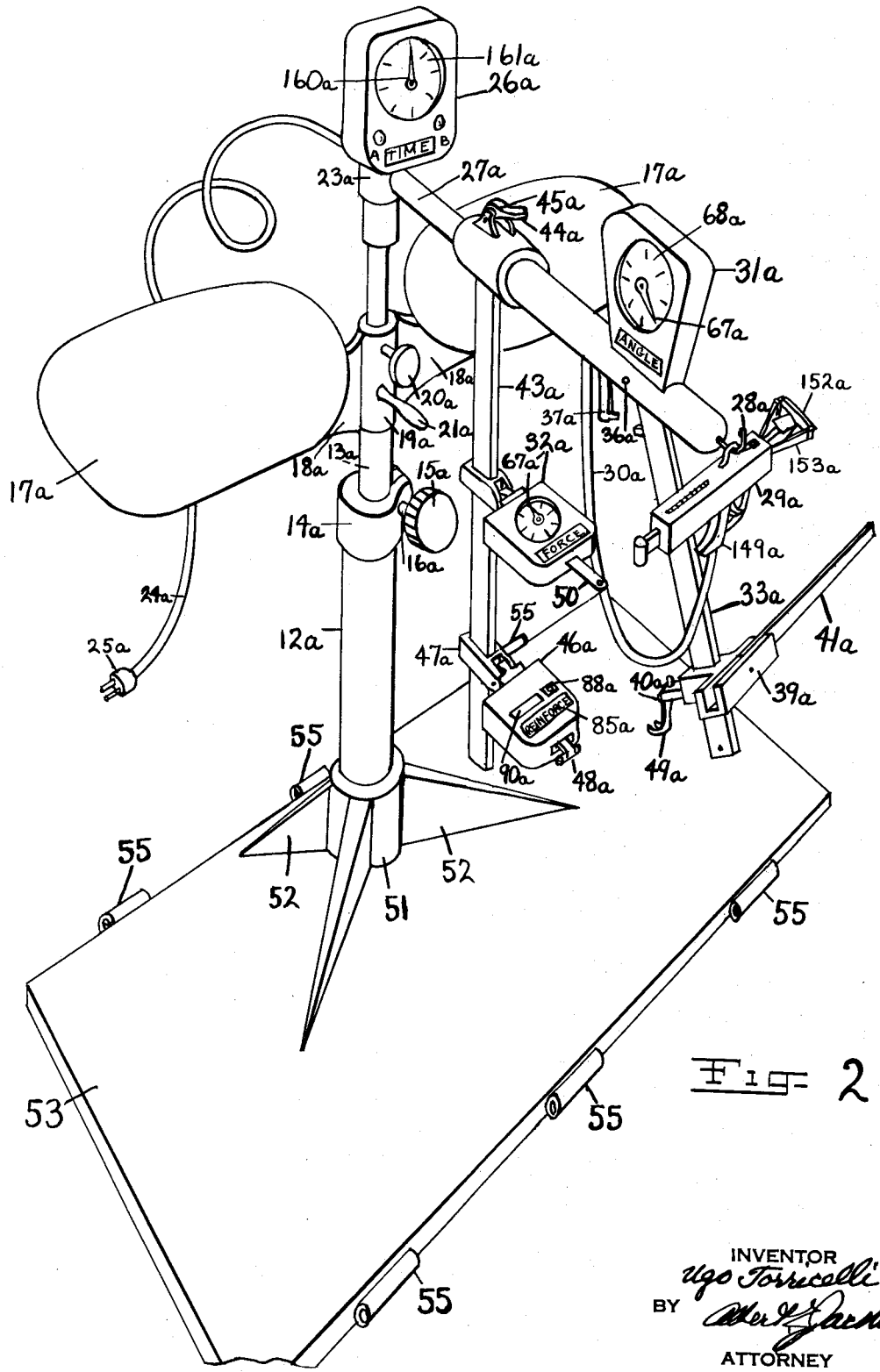

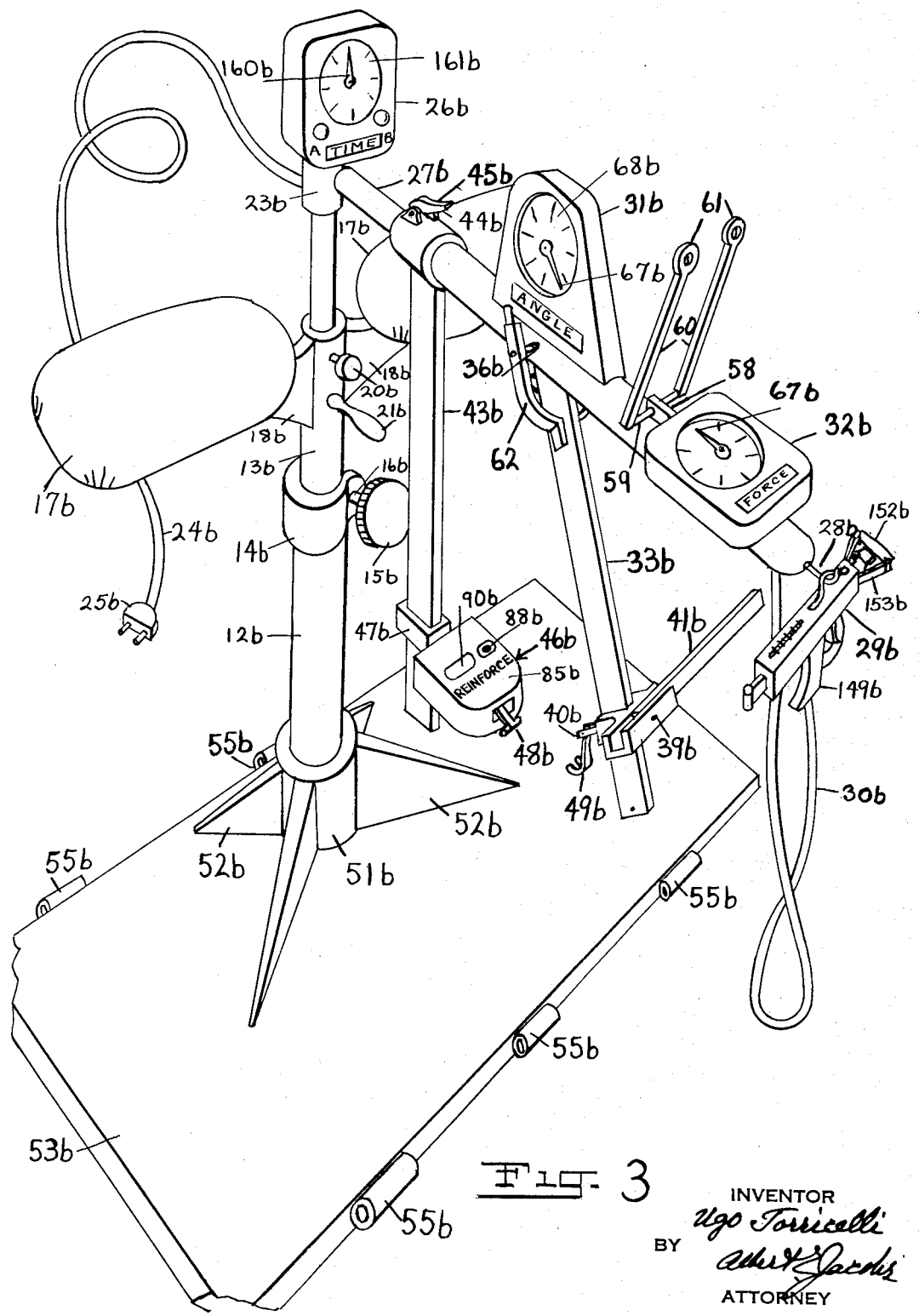

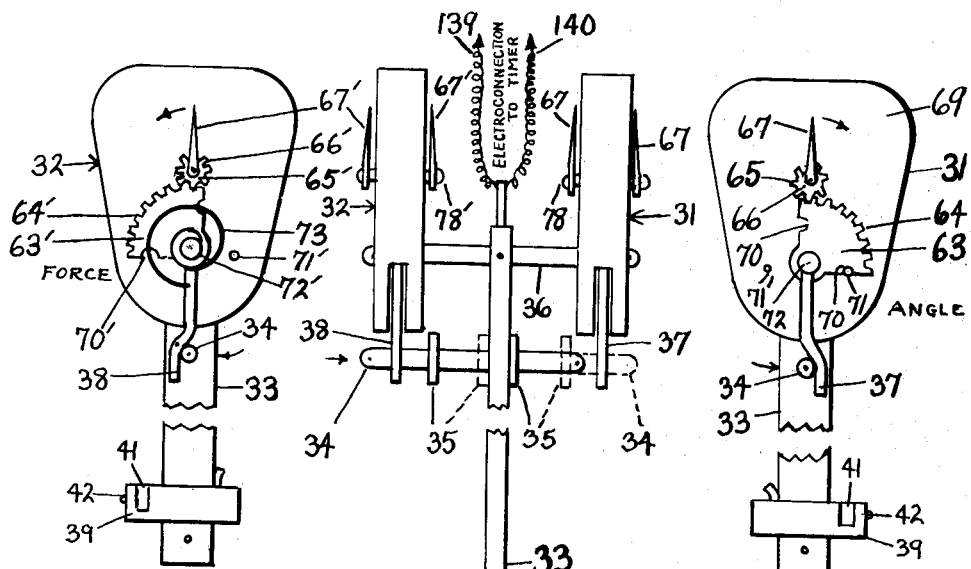
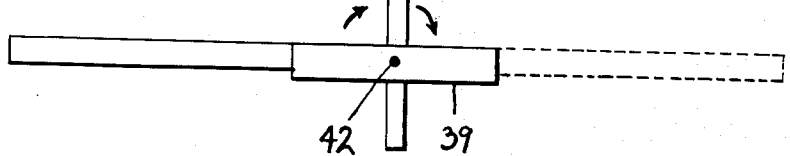
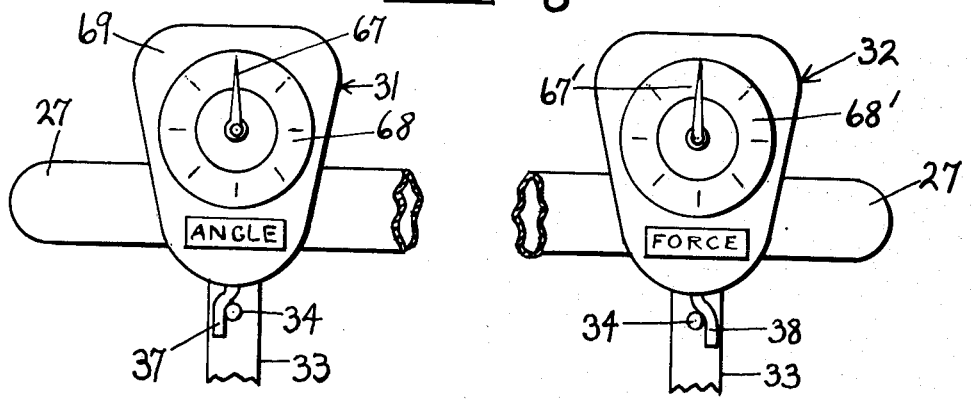

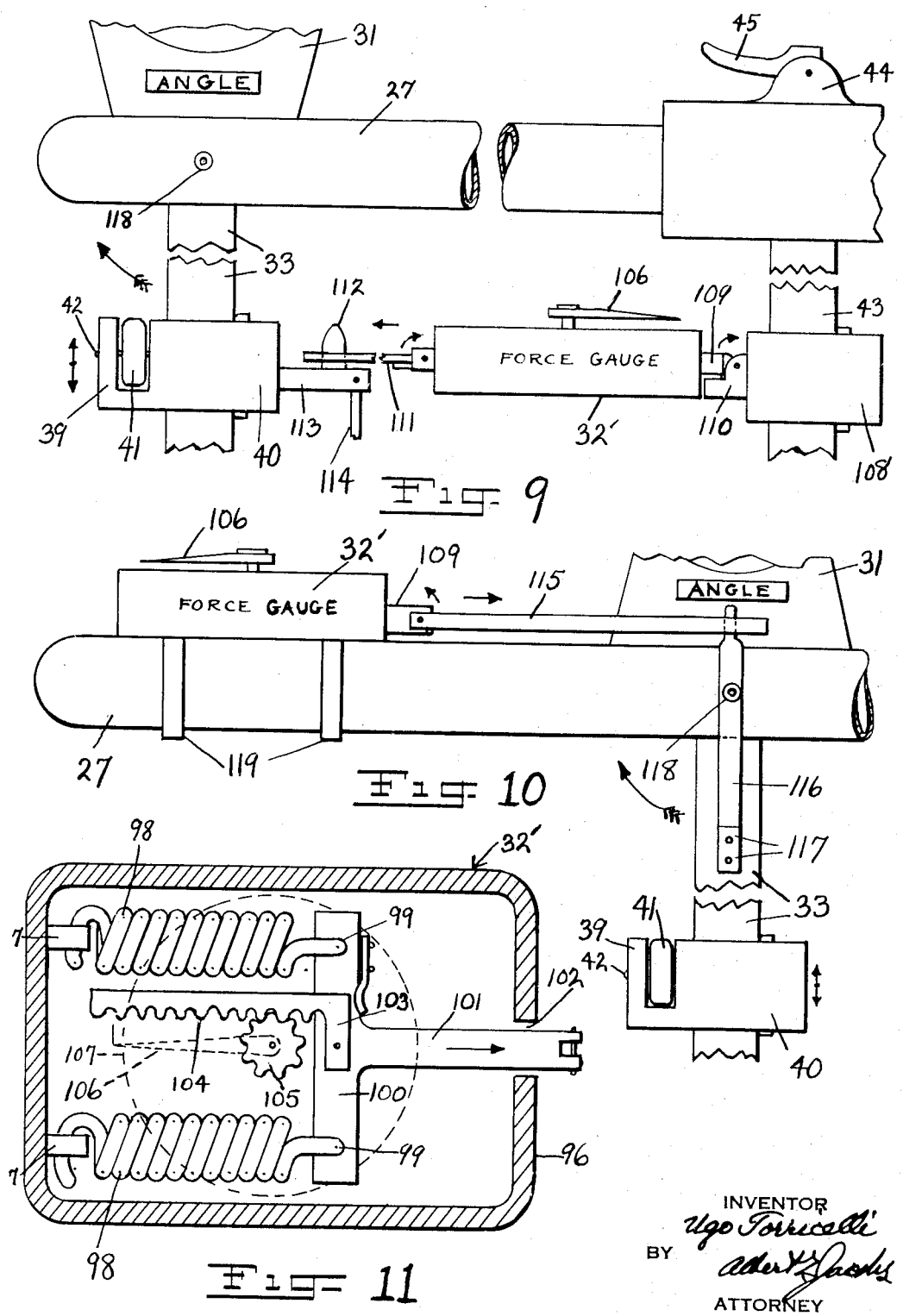

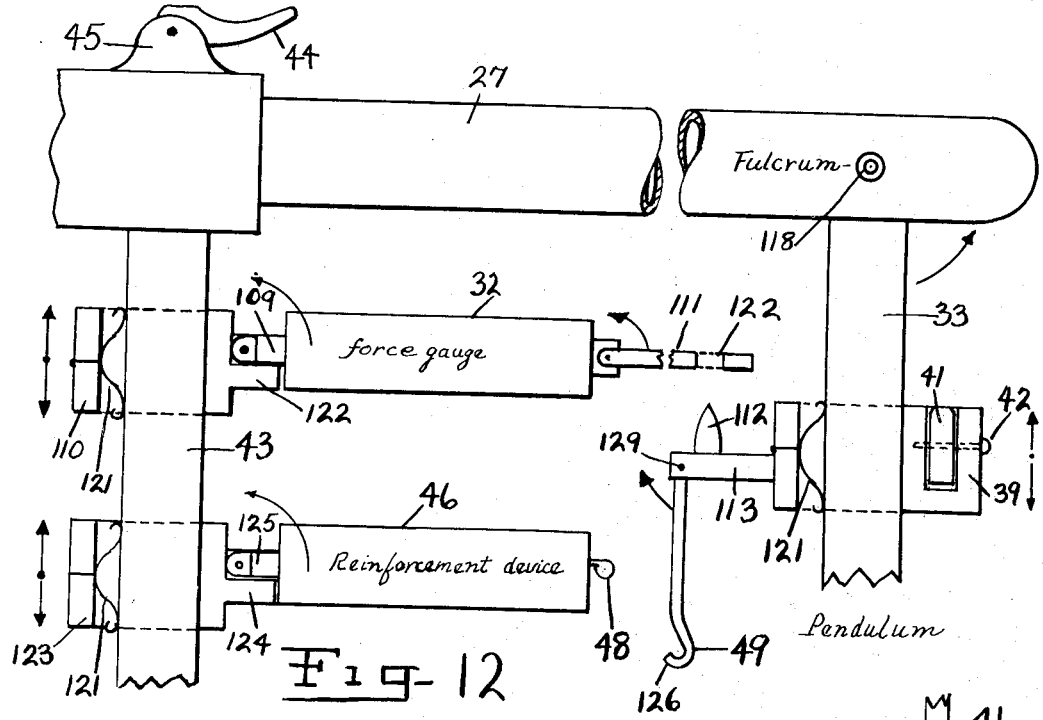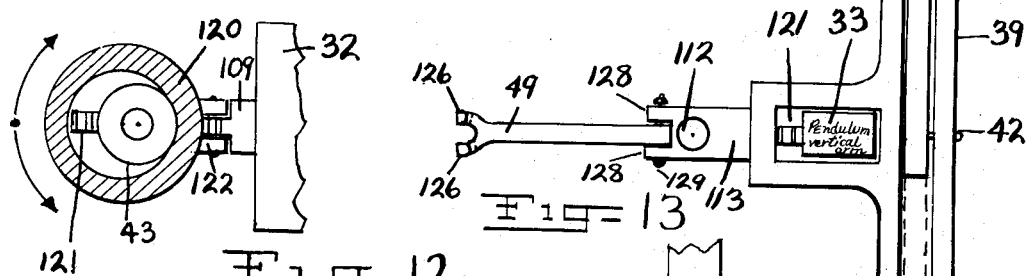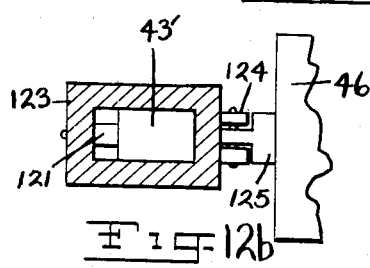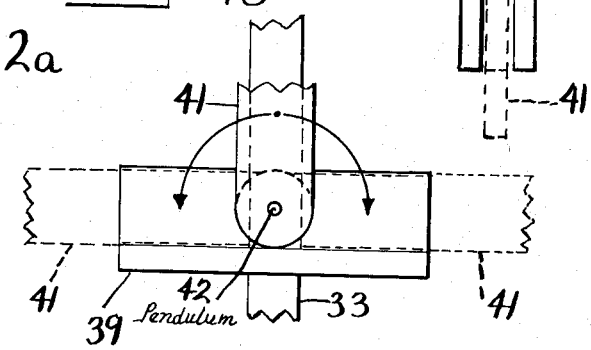

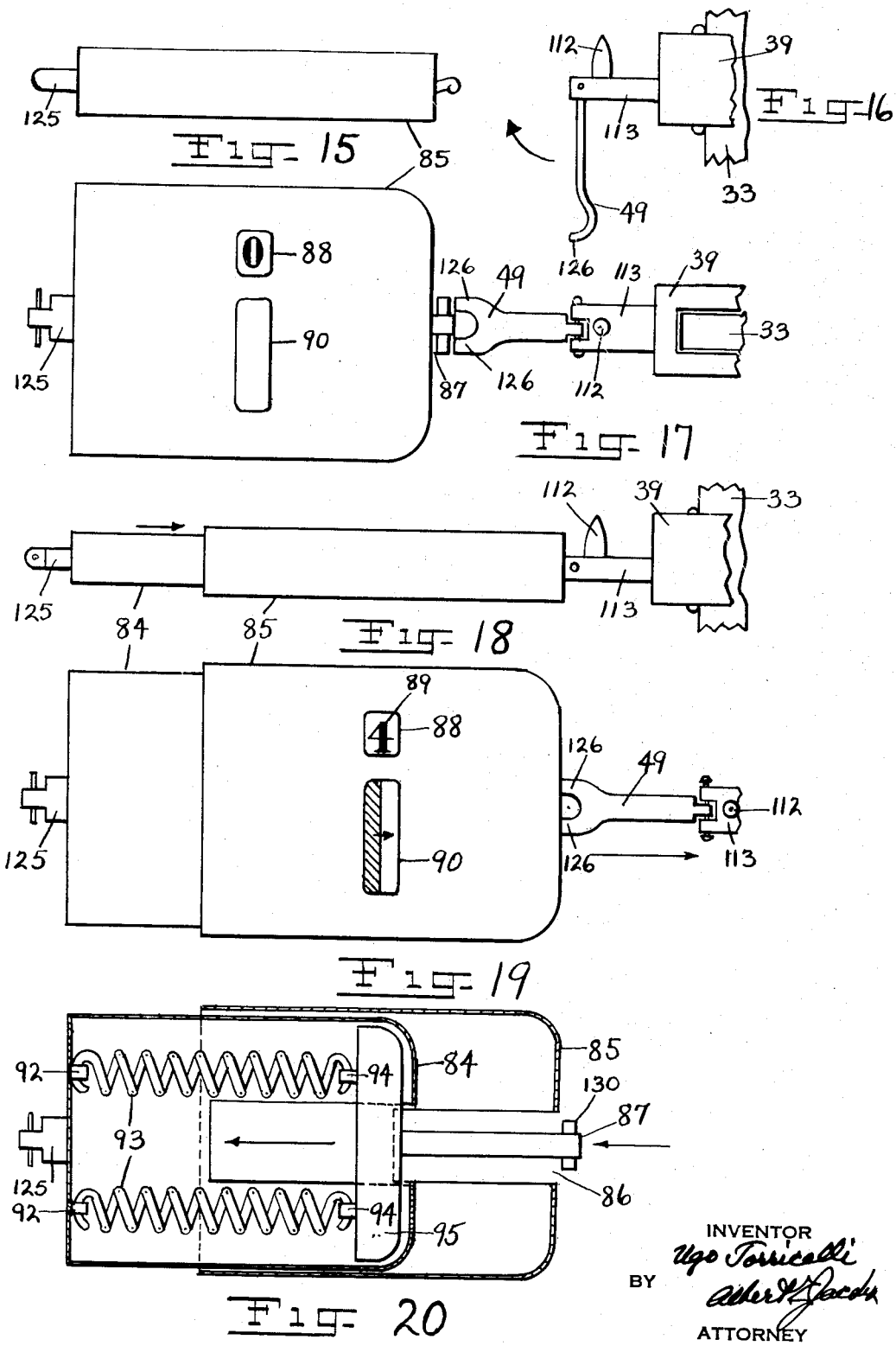

Sept. 6, 1955 U. TORRICELLI 2,716,978
APPARATUS FOR TESTING AND MEASURING HUMAN REFLEXES
Filed June 28, 1952 12 Sheets-Sheet 8
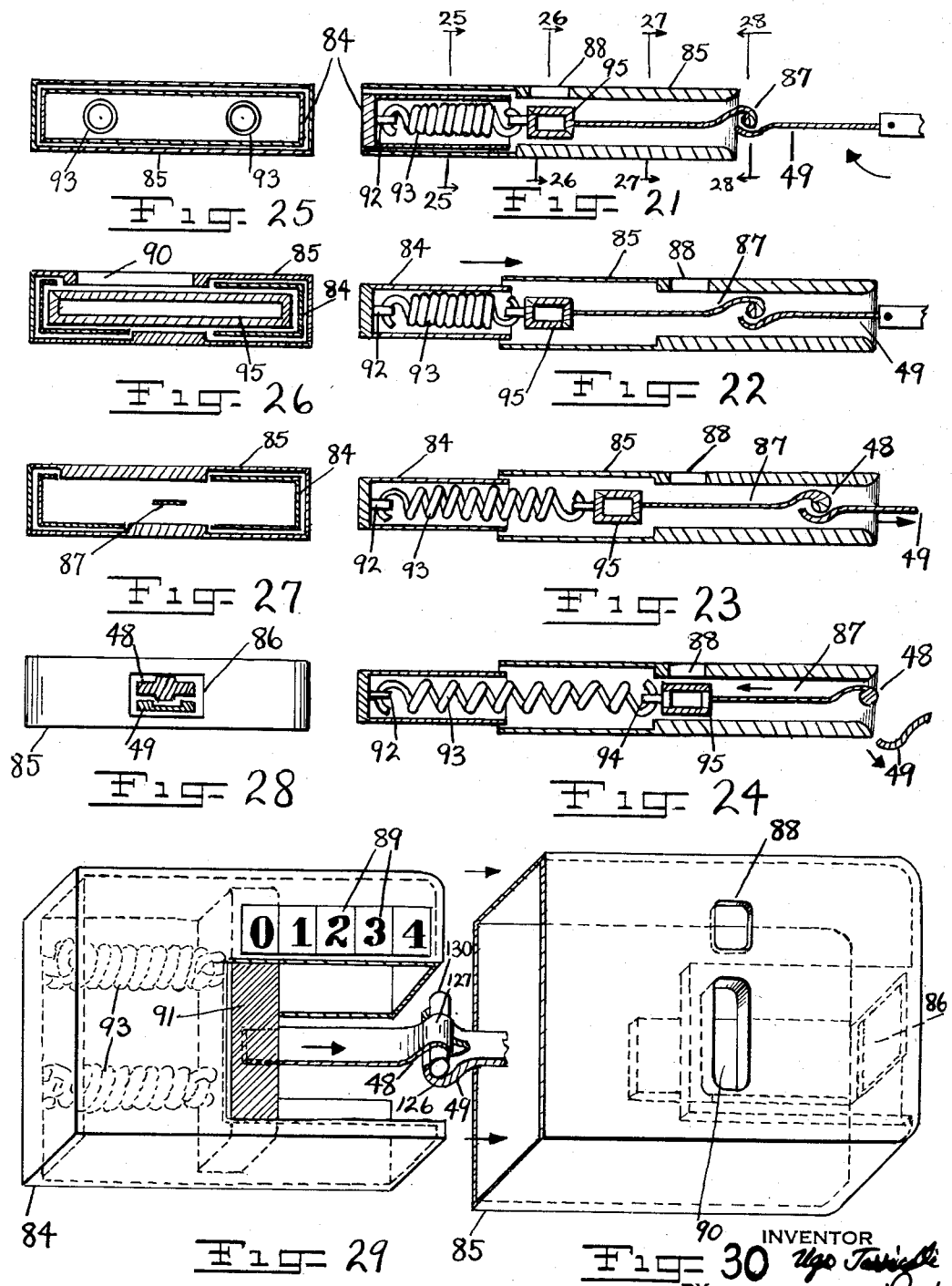

Sept. 6, 1955U. TORRICELLI2,716,978
APPARATUS FOR TESTING AND MEASURING HUMAN REFLEXES
Filed June 28, 195212 Sheets-Sheet 9

INVENTOR
Ugo Torricelli
BY
ATTORNEY

Sept. 6, 1955 U. TORRICELLI 2,716,978
APPARATUS FOR TESTING AND MEASURING HUMAN REFLEXES
Filed June 28, 1952 12 Sheets-Sheet 10
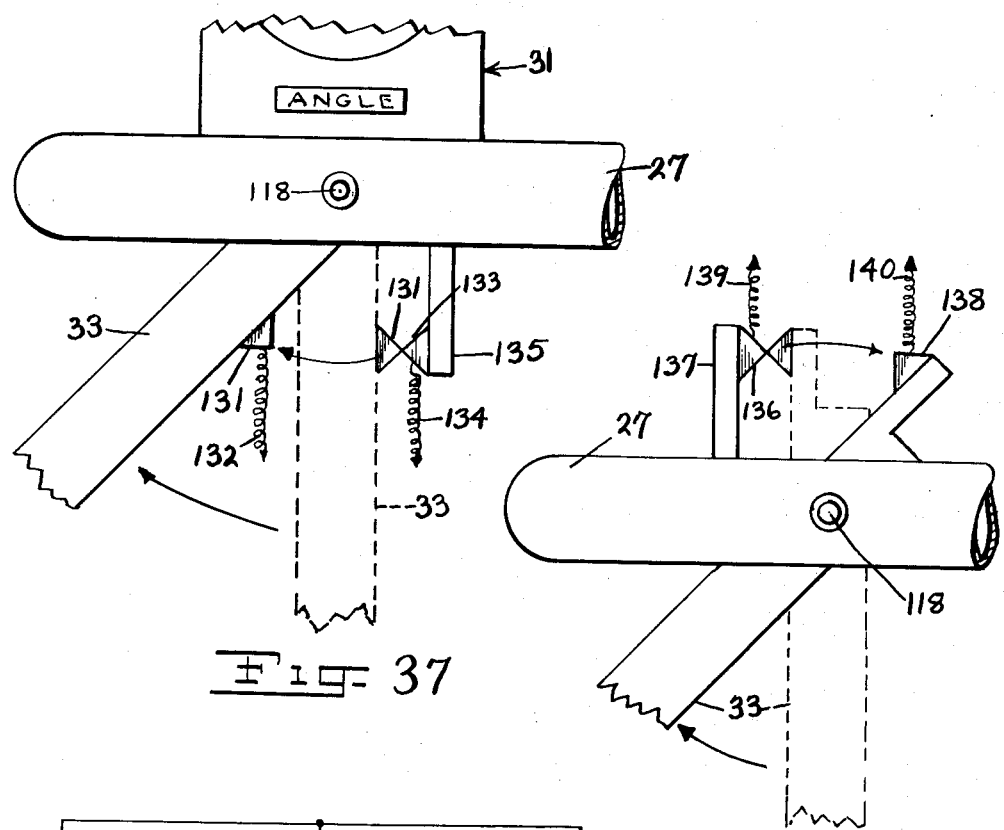
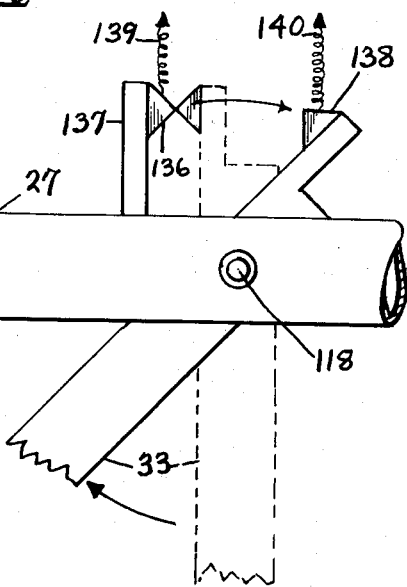
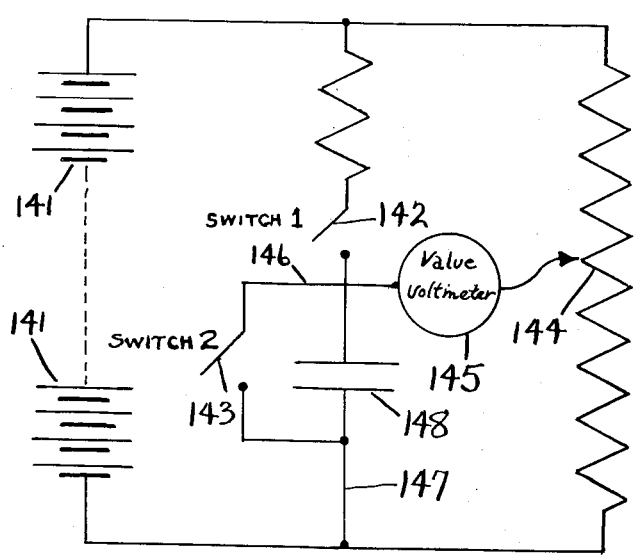
INVENTOR
Ugo Torricelli
BY
ATTORNEY

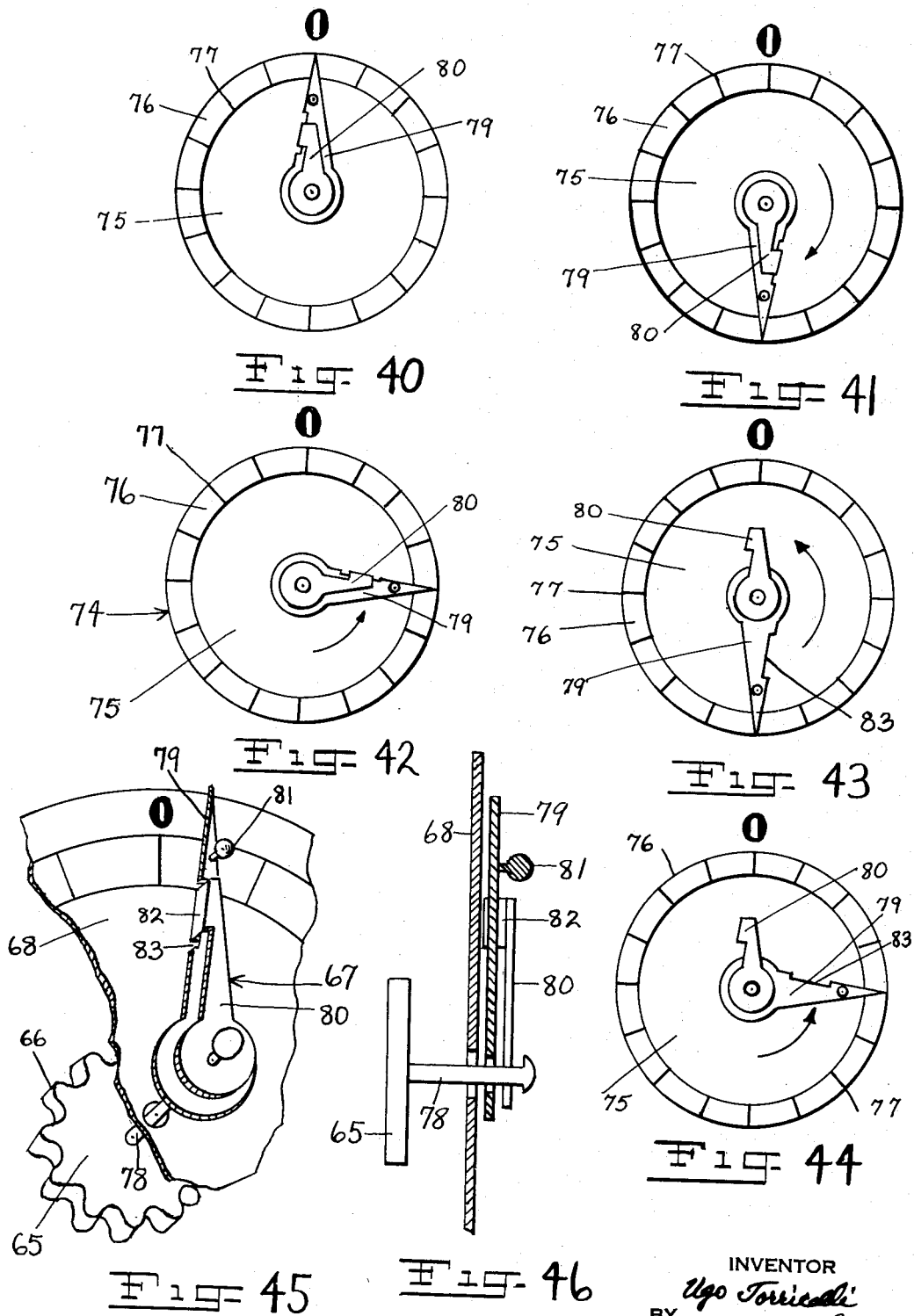

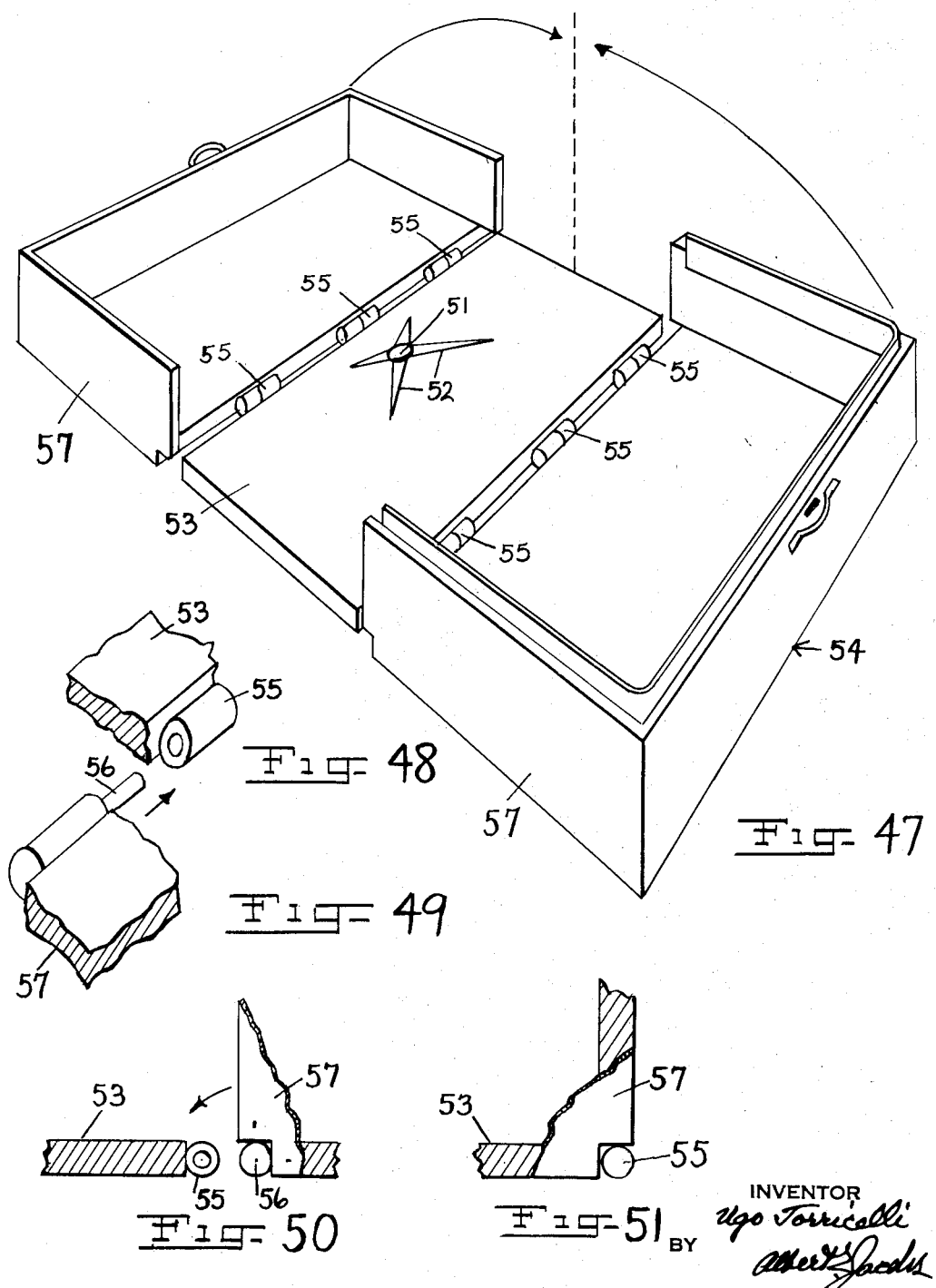

United States Patent Office 2,716,978
Patented Sept. 6, 1955

2,716,978

APPARATUS FOR TESTING AND MEASURING HUMAN REFLEXES

Ugo Torricelli, New York, N. Y., assignor to Torricelli Creations, Incorporated, New York, N. Y., a corporation of New York Application June 28, 1952, Serial No. 296,165

20 Claims. (Cl. 128—2)

This invention relates to apparatus which is especially designed and constructed for the complete testing and measuring of human reflexes and has utility in connection with the examination and diagnosis of average or well persons but has especial value for the examination and diagnosis of patients suffering from various diseases or other pathological conditions which affect the nervous system and/or the human reflexes, being of especial value where the reflexes are exaggerated or of greatly increased extent and where the knee, ankle and elbow reflexes of a given individual are abnormal and not in accord with one another or with what they should be.

There are many conditions under which it is desirable and informative to test and measure the human reflexes since these are believed to constitute a reflection of the state of health far beyond any recognition heretofore given thereto. For many years it has been the custom to test human reflexes as a part of a medical examination in a wholly empirical manner which is capable of indicating scarcely more than whether such reflexes are present or absent. This technique does not even involve the use of a known or constant striking force and thus has little medical significance. Such has been carried out merely by striking the appropriate portions of the patient with a simple metallic or non-metallic hammer and observing the result in a general manner. It some cases the leg is held firmly to estimate the force of the reflex action but this is clearly variable and uncertain. While such will usually indicate whether the reflexes are present or absent, they give little or no additional information despite the fact that it is known that various pathological conditions and nervous diseases directly affect the reflexes through their action upon the nervous system and the overlying musculature, certain conditions diminishing and even substantially destroying such reflex action and other conditions greatly exaggerating or increasing the same. So far as I am aware, there has been no practical, scientific and complete technique or apparatus for testing human reflexes and accurately measuring the reflexive action thereof so as to provide informative and accurate data, not only as to the presence and extent of the reflexive action but as to the time, force and other factors involved. Moreover, where reflexive action is greatly diminished or increased due to pathological or nervous disease conditions, there has been no way of evaluating such altered reflexes to determine the extent of their alteration and to correlate such findings with other findings of the medical examination so as to provide the physician with a scientific and accurate basis for diagnosis and treatment. In this connection, it must be borne in mind that since the reflexes in different portions of the same body may not be in harmony with one another, it is necessary to determine such separately and to study the interrelationships therebetween. These relationships may vary in one or all of the factors time, angle and force or any combination thereof and consequently an important advantage of my present apparatus is that it is capable of making all such determinations so that the relationships and patterns can be studied and evaluated.

There are, thus, numerous problems involved in connection with the testing and measuring of human reflexes which have never heretofore been solved and which would, if solved, constitute a basis for accurate determination of reflexive action, nervous system and related conditions of patients both healthy and afflicted with various diseases and at the same time the solution of these problems would provide means for determining the effect and extent of diminution or increase of the reflexive action, thereby providing a new, useful and highly valuable diagnostic tool and aid for the medical profession. Such means have not heretofore been known or available.

It is, accordingly, a major object of this invention to provide the medical profession with a unique, practical, complete and thoroughly accurate and scientific apparatus for testing and measuring human reflexes and the effect upon human reflexes of various disease conditions and for accumulating data and records in the form of case histories for measuring human reflexes and for determining the full significance thereof and changes therein.

Another object of the invention resides in the production of apparatus by means of which reflexive responses in human beings can be scientifically and accurately measured even where those reflexes are greatly changed as compared with normal or average human reflexes.

Another object of the invention is to provide for the first time a complete apparatus which is capable of testing and measuring human reflexes regardless of the magnitude thereof and whether exaggerated or diminished including means for reinforcing the reflexes by placing the reactive patient areas under a definite or determinate force or tension which becomes automatically disconnected when the reflexive action commences and the reinforcement force is exceeded.

A further object of the invention, therefore, resides in the production of a new and highly valuable combination apparatus comprising means for evoking action of the human reflexes, means for measuring the extent of movement of human limbs under reflexive action in terms of angular displacement, means for measuring the force of such reflexive limb movements and means for temporarily reinforcing the reflexive action with a force of known magnitude, variable at will, in order to enable accurate measurement and evaluation thereof, such means being applicable in various combinations and sequences.

A still further object of the invention resides in a combination apparatus for testing and measuring human reflexes which comprises limb supporting means, means for striking the reflex nerve areas of the limbs to evoke their reflexive response, and a timer, angle gauge, force gauge and reinforcement device all disposed in effective and efficient operational relationship for versatile use under various conditions.

Other and still further objects and advantages of the invention reside in the various combinations, subcombinations and constructional features hereinafter described and claimed and in such other and further matters as will be understood by those skilled in this art or made apparent hereinafter.

In the accompanying drawings wherein like numerals designate corresponding parts throughout the various views thereof:

Fig. 2 is a view generally similar to Fig. 1 but of a modified form of the invention disposed on a base forming a part of a carrying case shown in Fig. 47;

Fig. 3 is a persepective view of a still further modified form of the invention illustrating another form of organization of the invention especially with respect to the force gauge;

Figs. 4 and 5 are elevational views of the force gauge and angle gauge, respectively, showing the internal operating mechanism thereof;

Figs. 6 and 7 are, respectively, elevational views of the exterior of the force and angle gauges with fragmentary parts of the adjacent portions of the machine to show certain details thereof;

Fig. 8 is an end elevational view of the subassembly of force and angle gauges of Figs. 4–7 to illustrate the mountings and mode of operation thereof, together with certain of the electrical connections of the pendulum;

Fig. 9 is a fragmentary side elevational view on an enlarged scale of one arrangement of angle gauge and force gauge, and their operatively associated parts;

Fig. 10 is a view similar to Fig. 9 of a modified arrangement of such gauges and parts;

Fig. 11 is a plan view of the force gauge with its casing removed to show the internal constructional features therof;

Fig. 12 is a side elevational fragmentary view of the vertical arm of my machine with its force gauge and reinforcement device mounted thereon as in Fig. 2 and the pendulum with its connecting device for engagement with the force gauge or reinforcement device and its lateral arm for engagement with a limb of the patient; and showing at the bottom left thereof as Figs. 12a and 12b plan projections of alternative forms of mounting and adjustment means for the pressure gauge and reinforcement device;

Fig. 13 is a plan view of the bottom right-hand portion of Fig. 12 including the connecting device and lateral arm arrangement and range of movement;

Fig. 14 is a fragmentary elevational view looking from right to left of Fig. 13 and showing the arrangement and movements of the lateral patient-engaging arm;

Fig. 15 is a side elevational view of the reinforcement device in retracted condition;

Fig. 16 is a side elevational view of the connecting device shown mounted on a fragmentary portion of the pendulum.

Figure 31:
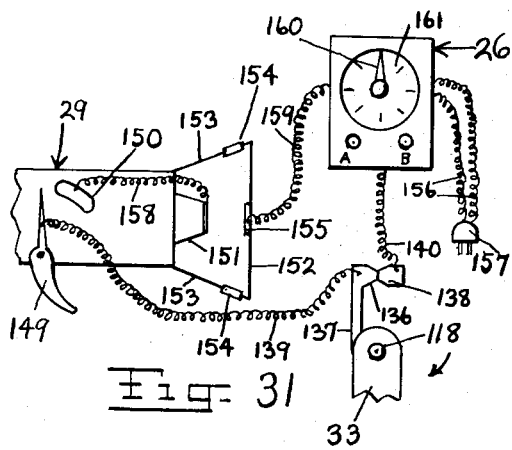
Figure 32:
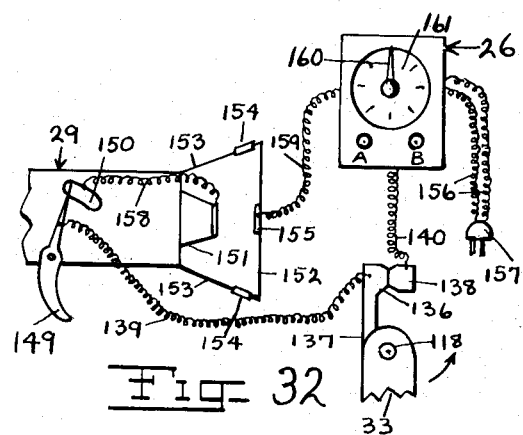
Figure 33:
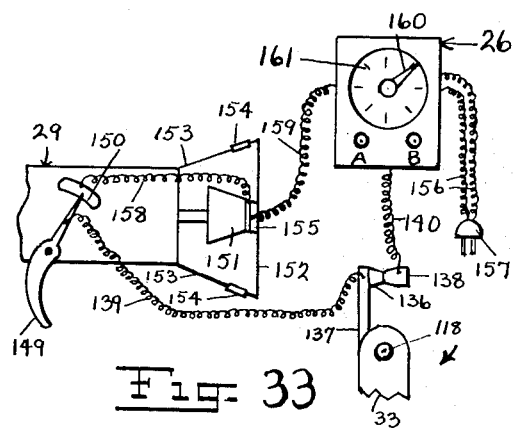
Figure 34:
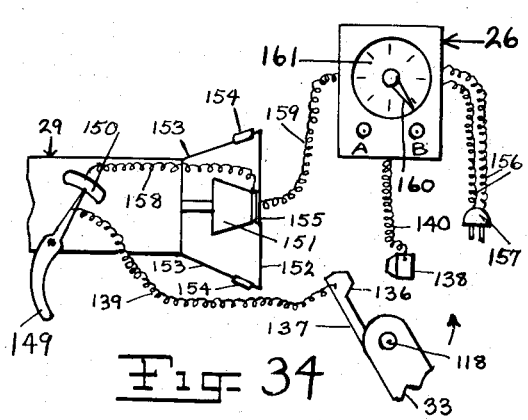
Figure 35:
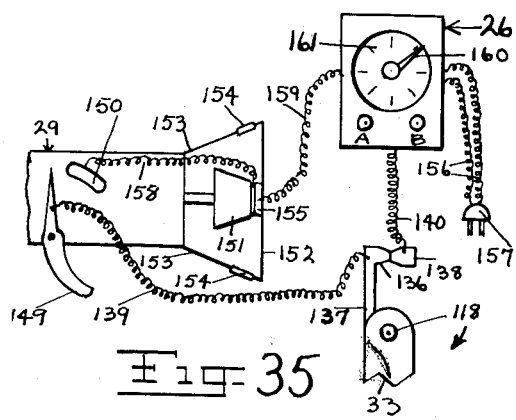
Figure 36:
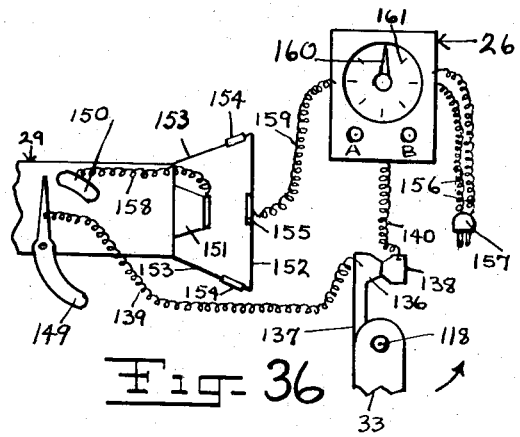

Fig. 17 is a plan view of Figs. 15 and 16 in their connected positions with the reinforcement device in the zero position;

Fig. 18 is a side elevational view of the parts of Fig. 17 but showing the reinforcement device in its most extended (4-pound) condition;

Fig. 19 is a plan view of Fig. 18;

Fig. 20 is a view of the reinforcement device portion of Fig. 19 showing the internal construction thereof and the relationship of the parts thereof in the most extended (4-pound) position;

Fig. 21 is a longitudinal sectional view through the reinforcement device in the zero position and a part of the connecting device on the pendulum during coupling;

Fig. 22 is a view similar to Fig. 21 but with the reinforcement device in the 2-pound extended position but before reinforcement action occurs;

Fig. 23 is a view similar to Fig. 22, also in the 2-pound position, and showing commencement of the reinforcement action;

Fig. 24 is a view similar to Fig. 23 but showing the reinforcement device during and immediately after the reinforcement action when the numeral 2 appears in the window of the casing and disconnection has just occurred immediately after the reflexive response has commenced;

Figs. 25, 26, 27 and 28 are, respectively, transverse sectional views taken on lines 25—25, 26—26, 27—27 and 28—28 of Fig. 21;

Fig. 29 is a perspective view of the inner casing of the reinforcement device and associated parts thereof which fit telescopically within Fig. 30 which is a perspective view of the outer casing of the reinforcement device with its top windows and end opening for viewing parts of the inner casing and for passage of the connecting member of the pendulum, respectively;

Figs. 31–36, inclusive, are in the nature of diagrammatic views of the timer gauge electroconnections and showing the several, cyclical, operational sequences thereof and wherein Fig. 31 illustrates the "ready" condition with the pendulum in its vertical or zero position and the striking gun charged but in its rest position;

Fig. 32 shows the same parts when initial pressure has been put on the trigger of the striking device and "contact" made;

Fig. 33 shows the "dash" and "shock" position with all three circuit contacts closed;

Fig. 34 shows the "measurement" position when arrest of the timer occurs and the pendulum circuit is disconnected;

Fig. 35 shows the manual return to rest or zero position with the striking gun charged and Fig. 36 shows the completion of the cyclical sequence with the system again in the "ready" position;

Figs. 37 and 38 are fragmentary front elevational views wherein there is illustrated alternative operational positions of the pendulum for the angle or force gauges and their timer contact interrelationship;

Fig. 39 is a diagrammatic view of the electrical circuits constituting the electronic chronographic principle involved in connection with the timer interrelationships;

Figs. 40–46, inclusive, show the dial and indicator needle construction and operation for the angle gauge, force gauge and timer, Figs. 40, 41, 42, 43 and 44 being front elevational or face views, Fig. 45 being a fragmentary perspective elevational view showing operational gearing and Fig. 46 being a vertical, medial sectional view, partly in elevation, through Fig. 45;

Fig. 47 is a perspective view of an open carrying case especially adapted for the reception of those forms of the apparatus shown in Figs. 2 and 3 and Figs. 48, 49, 50 and 51 are fragmentary perspective end views of portions of the carrying case of Fig. 47 showing certain constructional details thereof.

Figure 1:
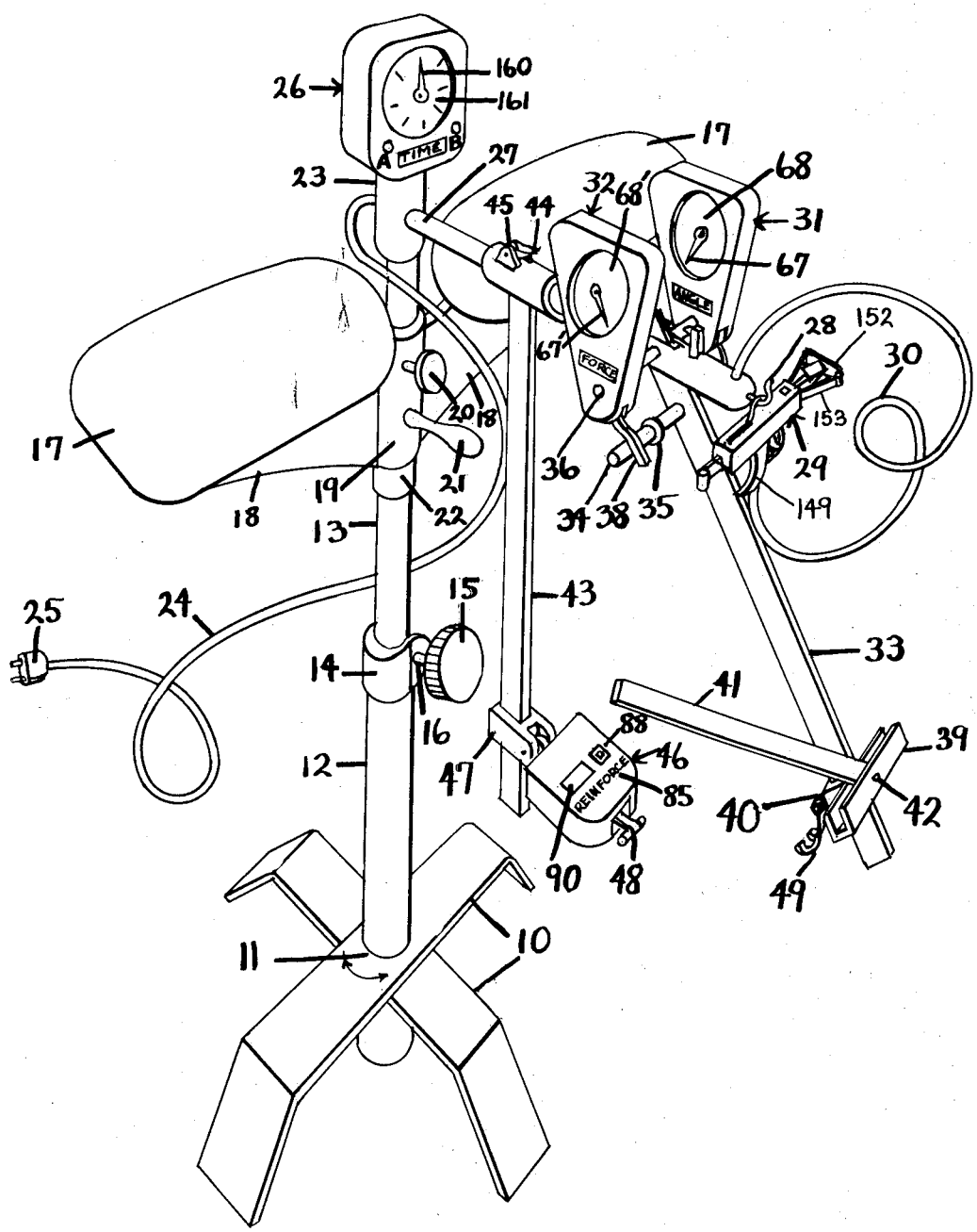
Fig. 1 is a perspective view of one form of the invention provided with limb supporting means, means for striking the limbs to evoke their reflexive responses, an angle gauge, a force gauge, a timer and a reinforcement device and showing the reinforcement device in disconnected condition.

The general combinations involved by the present invention are illustrated in Figs. 1, 2 and 3 of the accompanying drawings. From these figures, which illustrate typical modifications of the many physical embodiments which the invention may include, it will be apparent that the apparatus comprises means for supporting a pair of human limbs whose knee, ankle and elbow reflexive action is to be tested and measured, which means is adjustable to accommodate limbs of various dimensions and in various positions for tesing purposes, a pendulum which is actuated by the reflexive action of the limb tested and which is itself adjustable for limbs of various dimensions and for testing right and left limbs, means for striking the limbs to be tested so as to evoke movement thereof due to reflexive response, gauges (constructed as hereinafter explained) for timing the actions involved, for determining the extent of reflexive movement of the limbs (in terms of angle of deviation from the initial rest or pre-testing position), for indicating the magnitude of the forces involved (force gauge) and for reinforcing reflexive action with a known or definite force or pressure or for testing greatly diminished reflexes, all such gauges and devices being connected to, and operated from, a horizontal arm extending at right angles to a supporting column and within which horizontal arm certain electrical connections are disposed and from which the pendulum and vertical arm depend, all as will be hereinafter described and explained in detail.

Figs. 1, 2 and 3 further show, with respect to the general combination and organization of the component parts, that the various gauges can be mounted in specifically different locations and relationships, as will be clear from a comparison, for example, of Figs. 1 and 2, wherein the angle and force gauges are mounted on and operated from the horizontal arm (Fig. 1) and the reinforcement device is mounted near the lower end of a vertical arm suspended from such horizontal arm, whereas in Fig. 2 the angle gauge is mounted on the horizontal arm but in a different position with respect thereto and the force gauge and reinforcement device are both mounted on the vertical arm depending from said horizontal arm. Fig. 3 shows a further modified arrangement of the gauges and the manner of connecting the pendulum carrying the limb-contacting arm with respect to the horizontal arm and the force gauge.

Referring first to Fig. 1 in detail, the numeral 10 indicates a pair of crossed base members which are capable of being moved into nested alignment, when desired, for compactness and for storing the apparatus in a suitable carrying case. These base members are provided with central apertures 11 for the reception of a vertical supporting column 12 within which a telescoping column extension 13 is slidably associated, as shown, the supporting column 12 being provided at its upper end with a U-shaped strap or band 14 which can be tightened or loosened by turning the enlarged screw head 15 in a clockwise or anticlockwise direction, such movement turning the shank 16 thereof in the apertured ends of such strap to draw such ends together or to loosen them for raising and lowering the extension portion 13 of the column for adjusting purposes and for collapsing the entire column when the apparatus is to be placed in a carrying case provided for that purpose. Near the upper end of the extension portion 13 of the column, a pair of limb-supporting cushions or pillows 17 are mounted on brackets (not visible) which are carried by the lateral extensions 18 of the central cylindrical sleeve 19, which is mounted on such column extension so as to make it possible to adjust the height of the cushions or pillows 17 for a given patient. The cylindrical sleeve portion 19 is maintained at the desired elevation on the column extension by means of a screw or the like 20, the shank of which passes through an aperture in said cylindrical sleeve portion and makes contact with the column extension therebeneath. By counter-clockwise movement of the screw 20 the assembly is loosened so that the vertical height can be varied and when the height is correctly adjusted, as desired, the screw is turned in a clockwise direction to hold the cushions or pillows firmly in their adjusted position. Angular movements of said cylindrical sleeve portion 19 and hence of such cushions or pillows 17 may also be effected during the time that the screw 20 is loosened or withdrawn so as to enable the cushions or pillows to be angularly or laterally adjusted to suit the physiognomy of the patient or to enable testing to be carried out under circumstances where the patient is not ambulatory or, due to other causes, is confined in or restricted to a particular position or restricted against considerable bodily movement. The lateral or angular movement is facilitated by the provision of the handle member 21 which is connected to and extends horizontally outwardly from the cylindrical sleeve portion 19 preferably but not necessarily below the locking and unlocking screw 20. Column extension 13 may also be provided with an intermediate enlargement or collar 22 on which sleeve portion 19 rests for support.

The upper end of the column extension 13 is provided with an enlargement 23 containing electrical connections for the plug-in cord 24 terminating in plug 25 and for the various gauges, as will be hereinafter described.

A timing device or gauge (hereinafter referred to for convenience as a timer) designated generally by the numeral 26, is mounted on the upper end of the enlargement 23 and is provided with the electrical contacts and connections to be hereinafter described. Extending laterally from the enlargement 23 at the upper end of the supporting column is a horizontal arm 27, preferably hollow for the passage therethrough of electrical wiring but in other forms of the invention such wiring can be external and, therefore, the provision of internal wiring within the horizontal arm 27 is not to be deemed as a limitation upon the invention. At the distal end of horizontal arm 27 a hook or other element 28 is provided on which the striking device, generally designated by the numeral 29, is adapted to be hung or supported when not in use and a flexible member 30 connects the striking device with the outer end of such horizontal arm 27 as shown, thereby permitting the striking device to be removed for use and held in any desired or necessary position for evoking reflexive action of the human limbs supported on the cushions or pillows 17 without disconnecting the striking device from the horizontal arm. The flexible member 30 may be composed of any suitable material, such as flexible cable, of either metallic or non-metallic composition and contains or constitutes an electrical conductor forming an operational part of the circuits hereinafter described with especial reference to Figs. 31–36. In the form of the invention shown in Fig. 1, an angle gauge and a force gauge, respectively designated as a whole by the numerals 31 and 32, are operatively associated with the horizontal arm 27 and the portion of the horizontal arm between such gauges is provided with a depending, pivoted, elongated pendulum 33, preferably of rectangular cross-section, and composed of any suitable material, such as aluminum or stainless steel, but may, however, be composed of non-metallic materials, if desired or preferred. The mounting of the upper end of the pendulum 33 with respect to the horizontal arm 27 and the gauges 31 and 32 will be set forth below and is more particularly illustrated in Fig. 8. The construction of the angle and force gauges will also be set forth below and is more particularly illustrated in Figs. 4–7, inclusive, and, as to the dial construction and operation, in Figs. 40–46, inclusive.

Extending laterally from the pendulum 33 near the upper end thereof but below the horizontal arm 27 is a movable pin 34 provided with spaced collars 35, one of which is on either side of the pendulum 33. As will be noted especially from Fig. 8, the pin 34 is horizontally movable through and with respect to pendulum 33 depending upon which of the associated gauges is to be utilized and actuated, either one or both such gauges being actuatable at a time, and the limits of movement of pin 34 and the corresponding positions of collars 35 are clearly shown by the full and dotted lines in Fig. 8. Pin 34 is manually moved in the appropriate direction depending upon which gauge is (or whether both gauges are) to be utilized. The gauges 31 and 32 are themselves mounted at opposite ends of the fixed rod 36 superjacent the pin 34 just described and which rod 36 passes through the horizontal arm 27 and the pendulum 33, the gauges being secured at or adjacent the outer ends of such rod 36.

As will be appreciated from Figs. 4 and 5, in particular, the angle and force gauges 31 and 32 each have a depending pivotable link 37 and 38, respectively, the lower ends of which are somewhat offset so that one of them rests upon or against the pin 34 depending upon the particular position of such pin (see Fig. 8) and the gauge or gauges to be utilized. These links are connected to the internal structure of the gauges as will be hereinafter described but it will be appreciated that these links constitute connections for actuating such gauges from the pendulum and for causing them to give the desired indications during use of the apparatus and depending for test reading, as will be clear, upon the extent of movement of the pendulum 33 itself, this in turn being directly related to the extent of the reflexive action caused when the appropriate areas of the patient's limbs are struck by the striking device, which, as will be understood, is so constructed as to make it possible to apply a known or determinate striking force, since, otherwise, the extent of movement of the pendulum and the indications of the gauges would not provide accurately interpretable results, thus overcoming one of the major objections to existing empirical techniques and hammers. The construction of the striking device per se forms no part of this invention and reference is, therefore, made to my co-pending application Serial No. 236,247, filed July 11, 1951, which describes and claims the same.

Mounted adjacent the lower end of pendulum 33 is a transverse channel element 39 which is secured to the lower end of the pendulum 33 in any suitable manner which permits vertical adjusting movements, as by means of the U-shaped slide 40 which, as will be understood, can be fixed in any desired position for use with human limbs of different dimensions, as, for example, by means of a set screw or the like for holding the slide in its adjusted position. A limb-engaging bar 41 is pivotally connected at 42 centrally within the channel element 39 so that it can rest within the channel and extend in either direction therefrom, the position of limb-engaging bar 41 in Fig. 1 being an intermediate position for illustrative purposes, but, as shown in Figs. 8, 13 and 14, this bar, when in use, rests within the channel element 39 extending either to the left or to the right of the pendulum 33 depending upon whether a left limb or a right limb is being tested by the apparatus. This arrangement also avoids the objection of re-setting or adjusting the apparatus or of moving it and enables either limb to be tested merely by swinging the limb-engaging bar 41 from one horizontal position to the other, the bar in each such position being supported by the bottom of the channel element and being maintained between the side walls thereof against undesired movement.

As further shown in Fig. 1, a vertical arm 43, which may be constructed similarly to the pendulum 33, depends from a cylindrical sleeve 44 slidably mounted on the horizontal arm 27, said sleeve 44 being provided with a latch 45 for holding it in slidably adjusted position, and on the lower end of this vertical arm 43 the reinforcement device, designated as a whole by the numeral 46, is slidably mounted by means of the channeled connecting piece 47, the vertical position of which can thus be adjusted whenever required, and the position of the reinforcement device 46 on vertical arm 43 is correlated with the position of slide 40 of the channel element 39 on the pendulum 43, it being noted that said reinforcement device 46 and said slide 40 are provided with interconnectable and detachable coupling members 48 and 49, respectively, the structural details of which will be hereinafter explained, and these interconnectable coupling members constitute, as will be hereinafter more clearly understood, means for subjecting movements of pendulum 43 in response to the reflexive action of the patient's limbs to specially applied multiplying or additive forces of known, presettable amount so that test readings on the angle or pressure gauge can be obtained of adequate extent where the reflexive action of the patient is of a low or greatly abnormal order or where it is desired to secure a test reading or measurement with a known additive force, pressure or tension upon the reflexes, it being noted that the present empirical method of holding a patient's leg while striking the reflex with a hammer has little or no meaning since the amount of the holding force is not known and cannot be accurately or consistently reproduced for future comparative tests.

In Fig. 2, a somewhat modified form of the invention is illustrated, which, however, essentially embodies all the features of that form of the invention illustrated in Fig. 1 but represents a different organization of the component parts into a new combination. The similarity of the parts of Fig. 2 to those of Fig. 1 is indicated by the use of similar numerals followed by the suffix "a." In Fig. 2, however, it will be particularly noted that the force gauge 32a is mounted not on the horizontal arm 27a but on the vertical arm 43a above the reinforcement device 46a. This has the advantage that either the force gauge or the reinforcement device can be easily separately utilized and connected to the coupling member 49a of slide 40a on the pendulum 33a merely by adjusting the vertical position of such slide on such pendulum and making the interconnection between such and the force gauge or reinforcement device, the force gauge in this case being also provided with a cooperating coupling element 50 for interengagement with the hook-shaped member 49a pivotally mounted with relation to the slide 40a, as shown. This arrangement also makes it possible to utilize the angle gauge and the force gauge at the same time which cannot be as easily done by the apparatus of Fig. 1. In Fig. 2, also, the angle gauge 31a alone is directly mounted on the horizontal arm 27a and this has the advantage of somewhat increased visibility of the reading of the angle gauge while shortening or eliminating the rod 34 and represents a somewhat simpler mode of constructing the present apparatus.

The base members for the supporting column 12a in Fig. 2 are of somewhat different construction in that the same is composed of a cylindrical sleeve member 51 within which the lower end of the supporting column is received, and this cylindrical member has four triangularly-shaped feet 52 extending therefrom at 90° intervals, thus forming an exceptionally firm and satisfactory supporting base, which can readily be mounted upon the panel 53, which is especially adapted to cooperate with the carrying case designated, as a whole, by the numeral 54 in Fig. 47. It will be noted that panel 53 is provided with pintle sleeves 55 spaced along opposite side edges thereof for reception of the pintles 56 associated with each of the carrying case portions 57 shown in Fig. 47, this type of interconnection being per se well known and is like that used, for example, in portable typewriter cases. At the same time this type of arrangement enables the carrying case to be opened and the panel 53 to be bodily removed and the apparatus set up thereon in the manner shown in Fig. 2. As will be clear from Fig. 47, the carrying case portions 57 are adapted to be moved from the position therein shown to positions at 90° thereto in the direction of the arrows on said figure and then locked so that the entire apparatus is readily portable. The pintle and sleeve construction is, however, illustrated for the sake of completeness in Figs. 48 and 49, which are fragmentary views showing portions of the carrying case members involved and the pintle and sleeve construction above referred to. Figs. 50 and 51 show the same constructional details viewed axially of the pintle and sleeve members, Fig. 50 showing the parts disassembled or in exploded condition and Fig. 51 showing them in their assembled positions.

In Fig. 3 the same general combination is illustrated as in Figs. 1 and 2 but in a slightly modified form as compared with those figures. In this figure (Fig. 3) those parts which are similar to corresponding parts in Figs. 1 and 2 are so indicated by the use of the same numerals with the suffix small b and in this figure, as in Fig. 1, the reinforcement device 46b alone is mounted on the vertical arm 43b. Angle gauge 31b is mounted on horizontal arm 27b in a manner similar to that of Fig. 2 but the force gauge 32b is differently mounted, as shown, in a flat, horizontal position upon the horizontal arm 27b between the angle gauge 31b and the supporting element 28b for the striking device 29b. The force gauge 32b is, moreover, provided with an externally extending bar 58 apertured for the reception of the cross-piece 59 connecting the parallel arms 60 which terminate in somewhat enlarged circular flattened ends 61 so that, by swinging such arms downwardly to engage pendulum 33b the force gauge 32b is actuated by movements of the pendulum to give a test reading. In the position of the arms shown in Fig. 3, the force gauge is disconnected to permit use of the angle gauge 31b. It will also be noted in Fig. 3 that pendulum 33b is somewhat differently mounted on horizontal arm 27b by means of a yoke or the like composed of a pair of opposite arms 62 adapted to receive the ends of the rod 36b which passes transversely through horizontal arm 27b and which, by means already described above, causes actuation of the angle gauge proportional to the angular movements of the pendulum which is, in turn, as already explained above, actuated through the reflexive movements of the patient's limbs against the horizontal bar 41b in the channel element 39b.

Figs. 5 and 7 illustrate the construction and mode of operation of the angle gauge 31. From these figures it will be observed that the actuating link 37 which, as above described, is operated by the pin 34 of the pendulum 33 upon movement of the pendulum by reflex action of the patient, is rigidly connected at its upper end to a gear segment 63 which has an angular extent of approximately 90° and the gear teeth 64 of which mesh with the gear teeth 65 of a pinion 66, to which the indicator needle 67 of the gauge is securely fixed so that angular movements of the pendulum 33 are thereby translated into predetermined angular movements of the indicator needle over the dial 68 within the housing 69 for such gauge. It will be appreciated that the maximum extent of reflective action of a tested limb is ordinarily considerably less than 90° and that even in extreme cases where the reflexes are exaggerated the reflexive movement is still less than 90° and, therefore, it has been found that the use of a 90° gear segment is ample for all cases and that it is unnecessary to use a completely circular gear or a gear of greater extent than 90°, although it is to be clearly understood that gear segments of greater angular extent or completely circular gears can be employed, if desired, but, by utilizing a 90° gear segment, the advantage accrues that a relatively large gear segment can be employed giving correspondingly great needle movements and indications so that it is not necessary to read small deviations on the angle gauge dial, thus increasing accuracy and readability. As will be noted from Fig. 5, the opposite straight edges of the gear segment 63 are provided with semi-circular recesses 70 adapted to cooperate with the pins, 71' which, therefore, act as limiting stops so that the gear segment cannot move excessively or move to a position beyond that at which it would give a proper reading. The gear segment is pivotally mounted within the housing 69 on a short pin or shaft 72 and the link 37 is rigidly secured thereto so as accurately to measure angular movements of the pendulum 33, which is pivotally mounted on the said shaft 72 carrying the gear segment and link. The electrical contacts provided for the angle gauge, as shown in Figs. 37 and 38, will be described hereinafter in connection with the description and explanation of the various electrical circuits involved with especial reference to Figs. 31–36, inclusive.

Figs. 4 and 6 particularly illustrate further structural details of the force gauge 32 which is, as will be noted from a comparison with Figs. 5 and 7, generally constructed in a manner similar to that of the angle gauge 31, except that a spiral spring 73 is provided in the force gauge of known characteristics so that a known mechanical resistance and relationship exists or can be applied between movements of the link 38 and the, in effect, reinforced actuation of the gear segment 63', and hence the gear teeth 66' of the pinion 65' and the indicator needle 67'. One end of the spiral spring 73 is anchored in the shaft 72' and the other end is secured to the link 38. In other respects the construction of the force (reaction) gauge is essentially the same as the angle gauge and, when the indicator needle 67' of the force gauge moves over the dial 68' (Fig. 6), the force or reaction factor involved can be readily observed.

The indicator needle and dial constructions for the angle and force gauges are shown in detail in Figs. 40–46, inclusive. Each of the dials 68 or 68', for example, is constructed in the form of a disc 74 having a plain or unmarked central portion 75 and a graduated circumferential portion 76 having scale markings 77 with which, in practice, gauge numerals of appropriate value or magnitude are associated for recording and measuring purposes, such markings not being shown in these figures for clarity and simplicity. The shaft 78 has pinion gear 65 secured to it at one end behind the dial 68 and at its other end has the indicator needle construction 67 shown wherein there is a longer indicating needle 79 and a shorter overlying needle 80, the former having a manually-operable knob 81 extending therefrom and the latter having a portion 82 bent over at right angles and overlying a shallow cut-out portion 83 along one side of the longer needle 79. In this way, when the gauge is actuated, both indicator needles move to the position required by the movement of of the pendulum and thereafter the shorter needle which actuates the longer needle due to the construction just mentioned above, reverts to its initial position (its zero position), after the actuation of the gauge has been completed due to the movement of the pinion gear, when the reflexive action of the limb tested no longer causes force to be applied to the limb-contacting bar of the pendulum. However, were the indicator needles merely so constructed, there would be a serious disadvantage in that the gauge would give only a momentary reading which would have to be read off rapidly while watching the gauge closely and, consequently, by the use of the longer needle which remains in the position of maximum movement after the shorter needle has reverted to its zero position, a permanent gauge reading remains as long as desired and, after the operator or physician or technician has noted and recorded the reading, the longer needle is then moved back to zero position by the manual knob aforesaid until the longer needle is again received in the lateral bent-over portion of the shorter needle ready for the next cyclical operation. This type of indicator needle construction may be termed as a maximum indicating dial needle and has especial value for use in the present apparatus, as will be appreciated, especially due to the fact that a plurality of gauges and dials are involved, and it would be inconvenient or impossible to record momentary maximum readings only, and hence no assistant or second operator is required with the present construction. This arrangement greatly enhances, therefore, the practicability and ease and economy of operation and use of the apparatus and, as shown in Fig. 8, such gauges may be double-sided with duplicate dials and needles on both sides, thereby still further enhancing readability and ease of making test measurements.

The reinforcement device 46, 46a or 46b, all of which are identical, the construction and operation of which are particularly illustrated in Figs. 15–30, is applicable to all modifications of the invention having an angle gauge only or an angle gauge and a force reaction gauge on the horizontal arm; in the latter case the vertical arm 43 or 43b is added to the apparatus between the column support and the pendulum to accommodate the said reinforcement device and to couple it to the pendulum and, in the former case, the reinforcement device is mounted on a similar vertical arm 43a below the force reaction gauge when that component of the apparatus is mounted on the said vertical arm, as shown in the modification of Fig. 2. These general arrangements of the parts involved have been described above and, from Figs.

15–30, it will be noted that the reinforcement device is composed of two telescopically related, slidable casings, of which the inner somewhat smaller casing 84 slides within the outer receiving casing 85. The latter is generally box-like in shape, is open at one end for the reception of the inner casing 84 and has an end wall opening 86 for the passage of the handle-like coupling projection 87 of the inner casing 84. The outer casing 85 is also provided with two windows in its upper surface, the smaller of which windows 88 is adapted to render visible one of the numerals 89 provided on the inner casing (see Fig. 29) and the other of which windows 90 is elongated and adapted to render visible the color bar 91, or the like, on the inner casing, the appearance of such color bar (preferably, but not necessarily, red) and the numeral 0 in the respective windows, indicating the zero position of the reinforcement device. The appearance of any one of the other numerals through the small window 88 indicates the number of pounds of reinforcement added or involved by that position of the inner and outer casings. The inner casing 84 is provided with a pair of spaced anchor members 92 (Fig. 20) on the inner surface of one end wall of such inner casing into which one end of each of the helical springs 93 is hooked or otherwise secured, the other end of each such spring passing through, or being secured to, a similar member 94 at the opposite end of the casing on the cross-bar or -piece 95, from which the handle-like coupling member 87 aforesaid extends. This coupling or interconnectable member constitutes one of previously mentioned sets of inter-engaging or coupling members (48, 49; 48a, 49a and 48b, 49b) by means of which the reinforcement device can be detachably connected to the connecting element secured to the slide 40 of channel element 39 (Fig. 1). Fig. 17 shows the reinforcement device in the zero position, whereas Fig. 19 shows it in the 4-pound position, which means that 4 pounds have been added to the force required to effect movements of the pendulum, so that, for very weak reflexive action or where it is desired to apply an additive force to the test measurement, adequate or increased readings can, nevertheless, be respectively obtained, due allowance, of course, being made in the ultimate diagnosis of the patient. The use of the reinforcement device is optional or the reinforcement device may be in the zero position so that it has no appreciable influence on pendulum movements. It will be appreciated, as can be particularly observed from Figs. 21–24, that, as the interconnectable member of the pendulum moves, it effects definite known relative movements of the inner and outer reinforcement device casings, from the zero position (Fig. 21) to the fully extended position (Fig. 22), then the springs 93 are stretched until finally the desired numeral (representing pounds of added force) is visible through the window 88. The incorporation of this reinforcement device in my new apparatus is, so far as I am aware, entirely unique and greatly expands the scope of utility and versatility of the apparatus as a whole. It also makes it possible to carry out entirely satisfactory tests and measurements upon patients who could not otherwise be tested or measured with any degree of accuracy having any diagnostic significance.

In connection with the foregoing modifications of the invention, a force gauge such as 32 has been described which has the construction shown in Figs. 4 and 6 and is mounted in a position such as shown in Figs. 1, 2, 3 and 8. However, as illustrated in Fig. 11, a different construction of force or reaction gauge 32' may be employed wherein a hollow, box-like casing 96 is provided with anchoring devices 97 on the inner surface of one end wall thereof, into which one end of each of the helical springs 98 is hooked or secured, the other ends of such springs being passed through apertures 99 in cross bar 100 having a central, extending, handle-like coupling portion 101 which passes out through an aperture 102 in the opposite casing end wall. On the upper surface of the cross bar 100 one end 103 of the longitudinal gear rack 104 is secured, the gear rack extending rearwardly and adapted to be engaged by the teeth of a pinion gear 105, which is rotatably connected to the casing and has an indicator needle 106, of the type already described above, fixedly secured thereto, so that movements of the cross bar 100 and the movements of the gear rack 104 attached thereto cause corresponding movement of the pinion gear 105 and hence of the indicator needle 106, the associated dial being indicated in Fig. 11 by the broken lines 107.

This force reaction gauge may, as already indicated, be mounted in various ways with respect to the apparatus as a whole and two such modes of mounting are illustrated in Figs. 9 and 10, wherein the pendulum 33 with its associated slide 40, channel element 39 and limb-engaging bar 41 is shown as connected to the vertical arm 43 which is movable along horizontal arm 27 by the latching mechanism 45 and which is provided with a pressure slide 108 adapted to be moved up and down on the vertical arm 43 and to be secured in any such adjusted position in horizontal alignment with the pressure gauge 32', one end of which interconnects by means of the projecting coupling member 109 with a connector element 110 of the pressure slide 108 in such manner that the pressure gauge 32' can be rapidly swung upwardly when desired or required as immediately after the actuation thereof. The other end of the pressure gauge 32' is provided with a connecting link 111 fitting over an upstanding pin or the like 112 on the projection 113 from which the connecting coupling element 114 pivotally depends so as to facilitate connection and disconnection of the power gauge from the pendulum and its associated parts, the direction of movements of the various elements being indicated on Fig. 9 by the arrows.

In Fig. 10 the force gauge 32' is mounted on horizontal arm 27 in a manner such as that shown in Fig. 3 and in such case the force gauge may be directly connected as by means of a rod or link 115 to the reduced upper end of a strap or the like member 116 secured as at 117 to pendulum 33 and pivotally movable therewith about fulcrum 118, the force gauge casing being held, for example, on the horizontal arm 27 by means of the encircling straps or bands 19. Thus, as pendulum 33 swings about its pivot, the indicator needle 106 of the pressure gauge makes corresponding movements over the dial thereof to provide a suitable test reading or measurement and it will be appreciated that in certain respects the force reaction gauge is similar to and usable in place of the reinforcement device.

Referring now to Fig. 12, this shows on a somewhat enlarged scale the arrangement of horizontal arm 27, pendulum 33, vertical arm 43 and the associated limb-contacting bar 41 and sub-assembly, force gauge 32 and reinforcement device 46 and represents a somewhat modified arrangement as compared with Figs. 9 and 10 and responds to the arrangement shown in Fig. 2, wherein the force gauge and the reinforcement device are mounted one above the other on the vertical arm. The correspondence of the parts on Fig. 12 to the parts above described is indicated by the choice of numerals. Various modes of effecting the slidable adjustment of the channel element 39, force gauge 32 and reinforcement device 46 may be employed but I have found that those illustrated in Figs. 12, 12a and 12b admirably suit the purposes of the present invention. In general, these slidably adjustable members may be either of the annular type or the quadrangular type, as respectively shown in Figs. 12a and 12b, in which the numeral 120 designates an annular member eccentrically disposed in encircling relationship to vertical arm 43, a spring 121 preferably of the double leaf (semi-elliptical) type or a screw or other suitable holding instrumentality is disposed between the vertical arm 43 and the encircling annulus 120 so as to hold the arm and annulus in adjustably fixed position, it being noted that the annulus 120 is provided with a horizontal extension 122 (top of Fig. 12) on which the extension 109 of the force gauge is adapted to rest and to be pivotally secured, so that, as indicated by the arrows, the force gauge may be moved angularly upwardly and to the left when desired or required, so as to disassemble or disassociate it from the upstanding pin 112 on the horizontal projection 113 of the channel member 39 provided with the limb-engaging bar 41 as previously described, one end of the force gauge being provided with a projecting portion 111 having an aperture 122 adapted to fit over such upstanding pin but to be readily removable therefrom. As shown in the right-hand portion of Fig. 12, the channel element 39 carrying the pivoted limb-engaging arm 41 may be held in any slidably adjusted position on the pendulum 33 by means of a spring or the like 121, as already described. The disconnection, in Fig. 12, of the force gauge or reinforcement device from the pendulum is caused by either such device following the angular pendulum movement which has the effect of raising the connecting device thereon and hence the construction permits of such following movement and the disconnection caused thereby, while at the same time preventing jamming of these parts.

The reinforcement device 46, also slidably mounted on vertical arm 43 below the force gauge 32, is provided with means for holding it in any slidably adjusted position on such vertical arm and while this may, if desired, be of the same type as that of Fig. 12a described in connection with the force gauge 32, I prefer to use the quadrangular arrangement shown in Fig. 12b, but the choice of holding device depends at least to a large extent upon the cross-sectional configuration of the vertical arm 43; and, when the same is circular, the annulus of Fig. 12a is employed and, when the same is rectangular, the quadrangular form of Fig. 12b is employed; thus, in Fig. 12b, there is shown a quadrangular member 123 within which the rectangular vertical arm 43' is received and a spring or like device 121 holds the two in desired postion, so that the portion of the arm within the quadrangular member is firmly held in the position shown. As in the case of the force gauge, the adjustable holding device is provided with a horizontal extension 124 on which a longitudinal extension 125 of the reinforcement device 46 is received and held pivotally as, for example, in the manner of a hinge and pintle joint wherein the holding member is provided with a bifurcated end forming lugs 126 between which a single lug 127 of the pressure gauge or reinforcement device projection is secured, thus enabling the reinforcement device to be pivoted upward and to the left as indicated by the arrow in Fig. 12 for quick and simple disassembly or disassociation from the coupling member or hook 49 pivotally depending from the projection 113 of the slide element 39 carrying the limb-contacting bar 41 and all mounted on the pendulum 33 and being pivotable about a fulcrum indicated at 118. The hook member 49 is, of course, adapted to engage the projecting portion 48 of the reinforcement gauge, as shown in greater detail in Figs. 21–24, 29 and 30 and as described above.

Thus, it will be clear that either the force gauge or the reinforcement device may be secured to the pendulum 33, also termed a fulcrum device, for the purpose of providing the necessary readings and data in connection with the testing and measurement of human reflexes for diagnostic purposes. The arrangement shown in the upper right-hand portion of Fig. 12 relating to the slide element and limb-contacting arm are shown in plan view in Fig. 13 so that it will be seen that the holding arrangement for the slide element is essentially the same as that of the reinforcement device for a vertical arm of rectangular cross-sectional configuration. Figs. 13 and 14 also clearly show the range of movement of the limb-engaging arm 41 which is movable through an angle of 180° so that it may extend either in one horizontal direction or in the opposite horizontal direction depending upon whether the left or the right limb of the patient is to be tested and measured as to its reflexive action. Fig. 13 also shows that the horizontal projection 113 carrying the upstanding pin 122, which is conical or tapered at its upper end for ease of assembly and disassembly with the apertured extension 111 of the pressure gauge 32, is itself bifurcated to provide a pair of spaced lugs 128 between which one end of the hook-shaped coupling element 49 is received and held in pivotable position by a pintle 129 extending through all such members. The distal end of the hook-shaped element is also bifurcated, as explained above, and of U- or yoke-shape, as clearly appears from Figs. 13, 29 and 30, for example, and the projecting portion of the reinforcement device may, as shown in Figs. 20 and 29 in particular, be provided with a terminal cross rod 130 slightly wider than such projection so as to produce adequate coupling or holding power with respect to the bifurcated yoke coupling member 49 already described, thus forming, in effect, a shepherd's crook type of connection with excellent holding power and yet readily and quickly disassociable.

Referring now to Figs. 37 and 38, which are fragmentary front elevational views of portions of the angle gauge and adjacent pendulum structure, the numeral 27 designates the horizontal arm previously described and the broken lines 33 indicate the rest, vertical or zero position of the fulcrum device or pendulum pivotable with respect to the horizontal arm 27 about the fulcrum 118. The dotted line position of the fulcrum device or pendulum represents the inactive position thereof and, as will be seen from Figs. 37 and 38, under such conditions the electrical contact 131 provided on one side of the fulcrum device or pendulum 33 and provided with an electrical conductor 132 which, as hereinafter described, leads to and forms part of a suitable electrical circuit, is in contact with a similar but oppositely disposed contact member 133 having a conductor 134 on a depending portion 135 of the angle gauge 31. As seen in Fig. 37, this contact is immediately broken as soon as the fulcrum member or pendulum 33 moves toward the full line position. As will appear from Fig. 38, such movement of the fulcrum device or pendulum 33 breaks the circuit to the timer gauge 26, such occurring due to the separation of contact 136 on the arm extension 137 and the contact 138 on the upper end of the fulcrum device or pendulum 33, each of these contacts having an electrical conductor 139 and 140, respectively, leading to the timer circuit hereinafter described. Thus, these two figures show how the angle gauge and timer are electrically actuated during testing of the patient and deactivated when the testing operation has been completed and the parts restored to their initial mechanical position, it being understood that the fulcrum device or pendulum returns to vertical position when the force of the reflexive action of the patient's reaction is completed and the patient's limb removed from contact with the limb-contacting bar 41. These movements of the limb-contacting bar set into operation the various assemblies and circuits thereby involved. Fig. 8 further illustrates the electrical connections 139 and 140 to the timer at the upper end of the fulcrum device or pendulum, as just referred to, and shows the relationship thereof to the angle gauge 31 and force gauge 32 and the arrangement thereof shown in Fig. 1, it being again noted, as already stated above, that the electrical wiring may either be internally disposed within the horizontal arm or may be external of such arm, or partly both, the first arrangement being preferred but the second arrangement being equally feasible so far as operation of the apparatus is concerned. The internal wiring presents a better appearance and has added safety but either form of wiring may equally well be employed with complete effectiveness. As is shown for completeness in Fig. 39, a chronoscope-type electrical circuit, i. e., the basic principle of a chronoscope, is provided for the above-indicated purposes which is per se of known character and which, therefore, does not constitute a part of or a limitation upon the invention. This circuit involves batteries or other sources of current 141, a pair of switches 142 and 143, a variable resistance 144 and a valve voltmeter 145 connected between switch 2 and the potentiometer 144, switch 2 being disposed in a shunt line 146 openable and closable at such switch; and the main line 147 which is openable and closable by switch 1 is provided intermediate thereof with a condenser 148.

Figs. 31–36, inclusive, illustrate the timer electroconnections with the striking gun and pendulum in the various cyclical and sequential phases of the operation of the timer and the directly associated apparatus components. Fig. 31 illustrates what may be termed a "ready" position, wherein the striking device or gun 29, various structural forms of which are described and claimed in detail in my co-pending applicaton Ser. No. 236,247, filed July 11, 1951, and the structural details of which, therefore form no specific part of or limitation upon the present invention, is in its rest position charged and ready for actuation to strike a reflex nerve center of the patient to evoke the reflexive response. It will be noted that the timer 26 has two electric bulbs A and B, that designated "A" being preferably red and that designated "B" being preferably green. The striking device or gun 29 is illustrated at the left of Fig. 31 and the other figures of this series and includes a trigger 149, an arcuate contact 150 on the striking device housing, a striking contact element 151 preferably composed of rubber or other suitable composition, and a transverse, forward tension strip 152 held in position by means of angular diverging projecting members 153 and clamps or turnbuckles 154 and having a central contact element 155, it being understood that this transverse tension member makes contact with the limb of the patient at the area to be struck by the striking contact element 151 and has been found, as explained in the aforesaid co-pending application, to constitute a preferable and more accurate and consistent striking arrangement as compared with the direct striking by the element 151 without such transverse tension member. In this figure, also, the numeral 137 indicates the upper end or an upward extension of the fulcrum device or pendulum 33 which is provided with the contact 136 referred to above in connection with Fig. 38. The timer 26 itself, which is shown in the zero position, is provided with a cord 156 and plug 157 adapted to connect the same to a source of electrical current and may be, for example, that shown at 24 and 25 in Figs. 1, 2 and 3. The circuits are completed by means of the electrical wiring shown including the conductor 139 extending from the trigger 149 of the gun 29 to the contact 136 of the fulcrum device or pendulum 33, that numbered 158 extending from the arcuate contact 150 to the striking element contact 151, that numbered 159 extending from the central contact portion 155 of the tension member 152 to the timer 26 and that numbered 140 extending from the contact member 138 to the timer 26, thus completing the circuits. In Fig. 31, both lights A and B are lit, the green light B being lit when the gun is charged and the contact at the fulcrum member being made when the gun is charged but in its rest position prior to actuation; at this time, also, the fulcrum device or pendulum is in the vertical (zero) position. In Fig. 32 the parts are the same but initial pressure has been placed on the trigger 149 of the striking gun which, therefore, makes contact with the contact element 150 thereof but, otherwise, the parts and circuits are in the position and condition of Fig. 31. In Fig. 33 the condition of the parts and circuits is shown at the time the shock is given to the patient to evoke the reflexive response and at this time all three contacts are closed, as will be apparent—viz., the contact between the trigger of the gun and the contact element 150, the contact between the striking element 151 and the central contact portion 155 of the tension member 152 and the contact between the contact elements at the upper end of the pendulum. However, at this stage the green light has been extinguished and the indicator needle 160 has passed partially over the dial 161 of the timer toward its final or maximum indicating position. In Fig. 34, which may be termed the "measurement" position, the timer has stopped or been arrested due to the disconnection of the circuit at the pendulum, but the other contacts are still in effect and the indicator needle of the timer has moved to its maximum position. At this stage both timer lights A and B are extinguished. In Fig. 35, which may be termed "the return to zero or rest position," the striking gun trigger 149 has broken contact with contact element 150, the contact at the pendulum has been restored, the contact between the striking element and the central contact portion of the tension member is still in effect but the indicator needle 160 is now in the process of moving back to the zero position and the green light is extinguished. In Fig. 36 the parts are back in the "ready" condition of Fig. 31, as will be noted by a comparison of the positions of the various members and contacts, the striking gun being in the rest position but charged, both the red and the green lights being illuminated and the pendulum being ready to move in counterclockwise direction for contact-breaking purposes at the appropriate time when the associated limb-contacting arm is moved by the limb of the patient under the action of the reflexive response evoked by the striking gun, whereas, in Fig. 31, it will be noted from the directional arrow thereon that the pendulum has just completed its maximum movement in a clockwise direction; otherwise, Fig. 36 is the same as Fig. 31.

From the foregoing it will be understood that I have provided a new and medically important and valuable apparatus for testing and measuring human reflexes under all conceivable or foreseeable conditions of health and disease thereby making it possible not only to aid in the diagnosis of various disease conditions, particularly those diseases which affect the reflexes to exaggerate or diminish them, but also to compile data from which exceedingly valuable information can be derived regarding reflexive action during various states of health and lack of health and the presence or absence of particular diseases or combinations of diseases, so that such compilations will form important tools for the medical profession on the basis of which the results obtainable from my new apparatus can be even more accurately and scientifically interpreted and correlated and thus providing the medical profession with an entirely new and extremely important diagnostic tool or aid. My new apparatus embodies and incoporates all devices capable of contributing to the operational efficiency of the tests and measurements both mechanically and electrically and is, to the best of my knowledge, the only complete and fully accurate and scientific device of its kind. The apparatus hereinabove described and hereinafter claimed represents the culmination of extensive research and developmental work on my part and for the first time provides a complete apparatus for the intended purpose, which is constructed along practical and scientific lines and which is readily operated and highly advantageous for use under a great variety of conditions applicable to practically any patient, whether ambulatory or not. Other and developmental phases of the present invention will be understood from my co-pending applications Serial Numbers 177,884 filed August 5, 1950 now Patent No. 2,685,286; 219,492 filed April 5, 1951; 234,397 filed June 29, 1951 (now Patent #2,619,956) and 236,247 filed July 11, 1951, to which reference is hereby made for certain details and further explanations, such as that relating, in particular, to the striking device or gun and various operational conditions and considerations, but these applications do not describe and claim the new and complete combinations involved by this application.

I claim:

1. In an apparatus for testing and measuring human reflexes, a vertical support, a horizontal arm carried thereby, spaced angle and force reaction gauges mounted on said arm, a pendulum pivotally connected near its upper end to said horizontal arm between said gauges and a limb-engaging bar assembly on the lower end of said pendulum and connections between said pendulum and said gauges for actuating the same upon movement of said pendulum in response to movement of said limb-engaging bar assembly.

2. Apparatus in accordance with claim 1, in which said connections include a transversely disposed rod near the upper end of and manually movable at right angles to the axis of said pendulum, said angle and force reaction gauges each being provided with a depending link engageable with said trantsversely disposed rod, whereby, depending upon the transverse position of such rod, said angle and force gauges may be jointly and severally actuated by movements of said pendulum in response to reflexive action of the limbs to be tested.

3. Apparatus in accordance with claim 2, in which said angle and force gauges are each provided with a pivotable gear segment to which the depending link is secured, a pinion gear in mesh with said gear segment and an indicating needle carried by said pinion gear and movable therewith, angular movement of said pendulum effecting corresponding movement of said links and hence of said gear segments, pinion gears and indicating needles, and associated dials provided with indicating indicia thereon over which said needles are adapted to move to enable interpretation of the measurements so effected.

4. Apparatus in accordance with claim 1 in which said horizontal arm is provided with a depending vertical arm, a reinforcement device slidably mounted on said vertical arm near the lower end thereof and coupling members on said reinforcement device and the limb-engaging bar assembly of said pendulum, said coupling devices being instantly and automatically uncoupled when said pendulum moves angularly more than a predetermined amount.

5. Apparatus in accordance with claim 4, in which said reinforcement device is adapted to be pre-set to provide a predetermined number of pounds of force, uncoupling occurring immediately upon such pre-set force being exceeded by pendulum movement.

6. Apparatus in accordance with claim 5, in which said reinforcement device includes inner and outer telescoping casings the former of which is provided with indicia visible through windows in the latter and spring-controlled means within the inner casing adapted to be coupled to and uncoupled from the limb-engaging bar assembly for varying the telescopic relationship of said casings.

7. In an apparatus for testing and measuring human reflexes, a horizontal arm, a vertical arm depending from said horizontal arm, a pendulum pivotally mounted on said horizontal arm spaced from said vertical arm and normally parallel thereto, a force reaction gauge slidably mounted on said vertical arm and a limb-engaging bar assembly slidably mounted on said pendulum, said force gauge and bar assembly being provided with means for connecting the same together in instantaneously detachable manner.

8. Apparatus in accordance with claim 7 in which the connecting means includes an apertured extension on said force gauge and an extension for said bar assembly having an upstanding conical pin over which the force gauge apertured extension fits.

9. Apparatus in accordance with claim 7 in which the connecting means includes an apertured extension on said force gauge and an extension for said bar assembly having an upstanding conical pin over which the force gauge apertured extension fits, the force gauge being hingedly connected to its slidable mounting to enable the connection and disconnection aforesaid.

10. Apparatus in accordance with claim 7 in which a reinforcement device is slidably mounted on said vertical arm below said force gauge, said reinforcement device and said bar assembly being provided with cooperating coupling and uncoupling elements.

11. Apparatus in accordance with claim 7 in which a reinforcement device is slidably mounted on said vertical arm below said force gauge, said reinforcement device and said bar assembly being provided with cooperating coupling and uncoupling elements including a bifurcated hook pivoted to said bar assembly extension and in interengageable projection extending from said reinforcement device.

12. Apparatus in accordance with claim 7 in which a reinforcement device is slidably mounted on said vertical arm below said force gauge, said reinforcement device and said bar assembly being provided with cooperating coupling and uncoupling elements including a bifurcated hook pivoted to said bar assembly extension and an interengageable projection extending from said reinforcement device, the said reinforcement device being hingedly connected to its slidable mounting to enable the coupling and uncoupling action aforesaid.

13. Apparatus in accordance with claim 10 in which at least one of the slidable mountings includes an annulus eccentrically encircling the vertical arm and spring means between the annulus and the arm.

14. Apparatus in accordance with claim 10 in which at least one of the slidable mountings includes a quadrangular member around the vertical arm and spring means between such member and such arm.

15. In an apparatus for testing and measuring human reflexes in accordance with claim 7 wherein the force reaction gauge comprise a gauge housing having a graduated indicating scale on at least one side thereof, a pivoted gear segment in said housing, a pinion gear meshing with and turned by said gear segment, an indicating needle fixed to said pinion gear and movable thereby for indicating purposes over said scale and means for actuating said gear segment and hence said pinion gear and indicating needle in response to and proportionate with reflexive movements of the human limbs being tested.

16. Apparatus in accordance with claim 15 in which spring means of known characteristics is mounted in said gauge housing to impose a predetermined resistance to movement of said gear segment.

17. Apparatus in accordance with claim 16 in which spring means is a spiral spring.

18. In an apparatus for testing and measuring human reflexes in accordance with claim 7 wherein the force reaction gauge comprise a hollow, box-like, casing, a cross-bar within said casing having a handle-like coupling extension projecting through one end wall of such casing which is apertured for such purpose, anchoring devices on the inner surface of the opposite casing end wall, springs hooked into said anchoring devices and apertures in said cross-bar, an indicating needle mounted between said springs for movement over an associated dial and gear means for imparting movement to said indicating needle in response to movements of said cross-bar under the action of said springs.

19. Apparatus in accordance with claim 18 in which said gear means includes a pinion gear to which said indicating needle is fixed and a gear rack having teeth with which said pinion gear meshes, said gear rack being secured to an movable with said cross-bar.

20. Apparatus in accordance with claim 18 in which said gear means includes a pinion gear to which said indicating needle is fixed and a gear rack having teeth with which said pinion gear meshes, said gear rack being secured to and movable with said cross-bar and said springs being helical compression springs mounted longitudinally and in parallelism within said casing and acting to introduce a predetermined resistance to movement of said gear means and hence of said indicating needle.

References Cited in the file of this patent

UNITED STATES PATENTS

| | | |
|---|---|---|
| 435,049 | Haerter | July 6, 1886 |
| 2,400,411 | Hauptman | May 14, 1946 |
| 2,619,956 | Torricelli | Dec. 2, 1952 |

FOREIGN PATENTS

| | | |
|---|---|---|
| 44,018 | Austria | Sept. 10, 1910 |